US012794222B2

(12) United States Patent
Yang et al.

(10) Patent No.: US 12,794,222 B2
(45) Date of Patent: Nov. 10, 2026

(54) SURGE PROTECTION CIRCUIT

(71) Applicant: AES Global Holdings PTE Ltd., Singapore (SG)

(72) Inventors: Zi Yang, Shenzhen (CN); Qingfeng Liu, Shenzhen (CN); HongYan Shi, Shenzhen (CN); XianGui Chen, Shenzhen (CN)

(73) Assignee: AES Global Holdings PTE Ltd., Singapore (SG)

( * ) Notice: Subject to any disclaimer, the term of this patent is extended or adjusted under 35 U.S.C. 154(b) by 347 days.

(21) Appl. No.: 18/579,390

(22) PCT Filed: Jul. 15, 2021

(86) PCT No.: PCT/CN2021/106464

§ 371 (c)(1),
(2) Date: Jun. 26, 2024

(87) PCT Pub. No.: WO2023/283875

PCT Pub. Date: Jan. 19, 2023

(65) Prior Publication Data

US 2025/0023342 A1 Jan. 16, 2025

(51) Int. Cl.
*H02H 9/00* (2006.01)
*H02H 9/04* (2006.01)

(52) U.S. Cl.
CPC .................................... *H02H 9/04* (2013.01)

(58) Field of Classification Search
CPC ........................................................ H02H 9/04
See application file for complete search history.

(56) References Cited

U.S. PATENT DOCUMENTS 4,740,859 A * 4/1988 Little ..................... H02H 3/048 361/111
5,734,542 A * 3/1998 Cohen ..................... H04M 3/18 361/111
10,075,065 B2 * 9/2018 Marcinkiewicz ....... H02M 1/32
11,043,799 B2 6/2021 Bandel
2008/0094766 A1 * 4/2008 Casey .................... H02H 9/041 361/56

(Continued)

FOREIGN PATENT DOCUMENTS

EP 3799241 A1 3/2021

OTHER PUBLICATIONS

International Search Report & Written Opinion; PCT Application No. PCT/CN2021/0106464, mailed Feb. 1, 2022; 11 pages.

*Primary Examiner* — Stephen W Jackson

(57) ABSTRACT

A surge protection circuit includes a first surge protection device (SPD) including a first terminal coupled to a voltage potential and a second terminal. A second SPD includes a first terminal coupled to the voltage potential and a second terminal. A diode array includes a first plurality of diodes, each diode of the first plurality of diodes including an anode coupleable to a respective power line of an electronic circuit and a cathode coupled to the second terminal of the first SPD. The diode array also includes a second plurality of diodes, each diode of the second plurality of diodes including a cathode coupled to a respective power line of the electronic circuit and an anode coupled to the second terminal of the second SPD. The second terminal of the first SPD is further coupled to a common power bus of the electronic circuit.

20 Claims, 4 Drawing Sheets

(56) References Cited

U.S. PATENT DOCUMENTS

| | | | | |
|---|---|---|---|---|
| 2008/0310119 | A1 | 12/2008 | Giacoma | |
| 2009/0296302 | A1* | 12/2009 | Wiese | H04L 12/2881 361/119 |
| 2019/0222020 | A1 | 7/2019 | Lin et al. | |
| 2020/0366087 | A1* | 11/2020 | Ball | H02H 9/005 |

* cited by examiner

-PRIOR ART-

-PRIOR ART-

-PRIOR ART-

SURGE PROTECTION CIRCUIT

FIELD

Aspects of this disclosure relate to voltage protections and, more particularly, to surge protection of AC and/or DC voltage lines in the event of a voltage surge.

BACKGROUND

A power surge (also referred to as a "voltage surge", "voltage spike", or "transient voltage") is a high-energy electrical impulse of short duration experienced by an electrical system when there is a sudden electrical charge coupled into the electrical circuit. A power surge can originate from a variety of sources, both internal and external to an installed location.

A device that offers surge protection is a surge protection device or more commonly referred to as a surge protection device (SPD). An SPD is typically designed for either AC or DC applications. The component that absorbs and passes a voltage surge inside an SPD is often referred to as a surge element. Surge elements include, but are not limited to, a metal oxide varistor (MOV), a transient voltage suppressor (TVS) diode, a thyristor surge protection device (TSPD), a gas discharge tube (GDT) and a spark gap overvoltage suppressor. Each SPD may include a plurality of surge elements connected in series, parallel, or a combination of series/parallel to achieve a particular surge rating for the SPD.

FIG. 1 is a circuit diagram illustrating an exemplary prior art circuit 100 protected against voltage surges. In one example, circuit 100 may be a telecommunications circuit including a DC power distribution circuit 101 supplying power to a plurality of remote radio units (RRUs) 102. In FIG. 1, a negative DC voltage circuit having a −48V voltage bus 103 and a common bus 104 is illustrated as an example. The −48V voltage bus 103 has a plurality of fuses 105 coupled thereto, each fuse coupling a respective power line 106 to the bus 103 for supplying power to a respective RRU 102. A surge protection system 107 including a plurality of SPDs 108 provides isolation and surge protection between the voltage lines of the DC power distribution circuit 101 from earth ground. When deployed outdoors, such protection is designed to protect the system from lightning strikes, for example.

A drawback of the prior art voltage surge protection of the circuit 100 of FIG. 1 is that distinct SPDs 108 are required between each power line 106 and earth ground and between the common bus 104 and earth ground. Thus, for the prior art system with n power lines, the number of required SPDs is n+1. Such dedicated protection for each individual power line and common bus increases the cost and size of the surge protection system.

The above-described drawbacks in SPD protection systems designed for DC applications are also present with respect to SPD protection systems designed for AC applications for use in protection of multi-line, multiphase AC power systems.

FIG. 2 illustrates a prior art circuit concept 200 for reducing the number of SPDs in a multi-line DC system as disclosed in U.S. patent application publication 20200366087 (USPGPUB '087), entitled "Surge Protection Device for the Protection of Multiple DC or AC Power Lines", by applicant Mersen USA EP Corp. As shown in FIG. 2, a rectification circuit 201 has a plurality of diodes D1-D10 coupled between the lines (L1-L3, N) and an SPD 202 and between earth ground and the SPD 202. The circuit 200 is presented as a single-SPD protection system sufficient to protect the lines from voltage surges. In an example of a positive voltage surge between line L1 and neutral (N), the voltage surge follows a path from line L1 through diode D1, SPD 202, and diode D9 to reach the neutral line. In an example of a positive voltage surge between line L1 and ground potential (e.g., earth ground), the voltage surge follows a path from line L1 through diode D1, SPD 202, and diode D8 to reach earth ground. A drawback of the design of the rectification circuit 201 of the prior art circuit 200 requires the voltage surges to pass through two diodes.

FIG. 3 illustrates another prior art circuit concept circuit 300 presented in USPGPUB '087 reduces the number of diodes but increases the number of SPDs. As illustrated, the rectification circuit 301 includes diodes D1-D8 coupled between lines L1-L3 and an SPD assembly 302 having three SPD 303-305 and between earth ground and the SPD assembly 302. In an example of a positive voltage surge between line L1 and neutral N, the voltage surge follows a path from line L1 through diode D1 and SPD 303 to reach the neutral N. In the case of a negative voltage surge, the voltage surge follows a path from neutral N through SPD 305 and diode D5 to reach the line L1. In response to a positive voltage surge between line L1 and lines L2, L3, or earth ground, the voltage surge follows a path from line L1 through SPD 304 and through respective diodes D6, D7, and D8 to reach lines L2, L3, or earth ground. While the circuit 300 eliminates the diodes coupled to the neutral N as compared with the circuit 200, a drawback of the voltage protection of the circuit 300 is that the number of SPDs is increased to a required three SPDs as disclosed in USPGPUB '087.

BRIEF STATEMENT

In accordance with one aspect, a surge protection circuit for an electronic circuit having a common power bus, a first power bus having a first voltage potential with respect to the common power bus, and a plurality of power lines providing power from the first power bus to a plurality of load devices coupled between the plurality of power lines and the common power bus. The surge protection circuit comprises a first surge protection device (SPD) including a first terminal coupled to a second voltage potential distinct from the first voltage potential and a second terminal. A second SPD includes a first terminal coupled to the second voltage potential and a second terminal. A diode array includes a first plurality of diodes, each diode of the first plurality of diodes including an anode coupled to a respective power line of the plurality of power lines and a cathode coupled to the second terminal of the first SPD. The diode array also includes a second plurality of diodes, each diode of the second plurality of diodes including a cathode coupled to a respective power line of the plurality of power lines and an anode coupled to the second terminal of the second SPD. The second terminal of the first SPD is further coupled to the common power bus.

In accordance with another aspect, an electronic circuit comprises a common power bus, a first power bus having a first voltage potential with respect to the common power bus, a plurality of power lines configured to provide power from the first power bus to a plurality of load devices coupled between the plurality of power lines and the common power bus, and a surge protection circuit. The surge protection circuit includes a first SPD, a second SPD coupled to the first SPD via a second voltage potential distinct from the first voltage potential, and a diode array.

The diode array includes a first subset of diodes coupled between the plurality of power lines and the first SPD and includes a second subset of diodes coupled between the plurality of power lines and the second SPD. The second terminal of the first SPD is further coupled to the common power bus.

BRIEF DESCRIPTION OF THE DRAWINGS

The drawings illustrate embodiments presently contemplated for carrying out the invention.

In the drawings.

DETAILED DESCRIPTION

Figure 1:
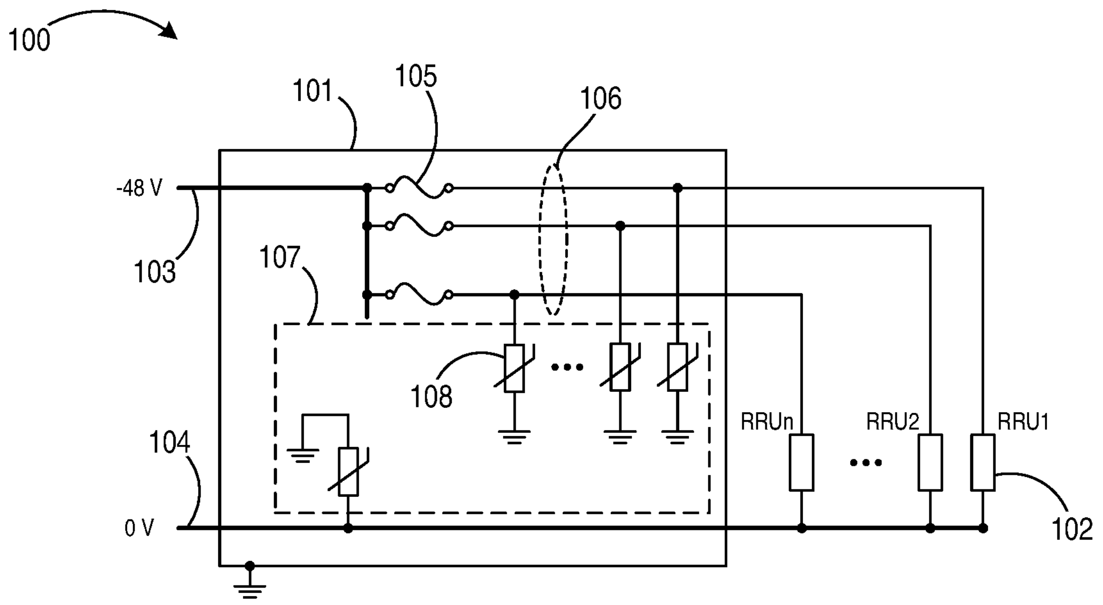
FIG. 1 is a circuit diagram illustrating an exemplary prior art voltage protection for protecting a DC power system having one or more DC power lines.
Figure 2:
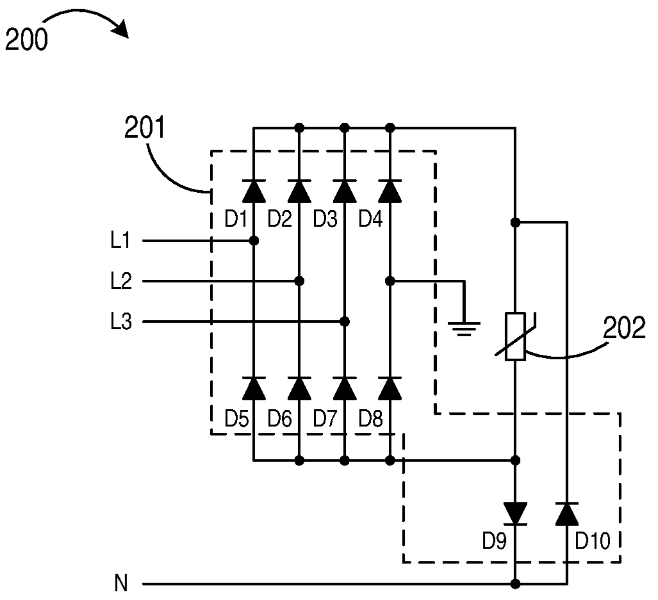
FIG. 2 is a circuit diagram illustrating another exemplary prior art voltage protection for protecting a DC power system having three DC power lines.
Figure 3:
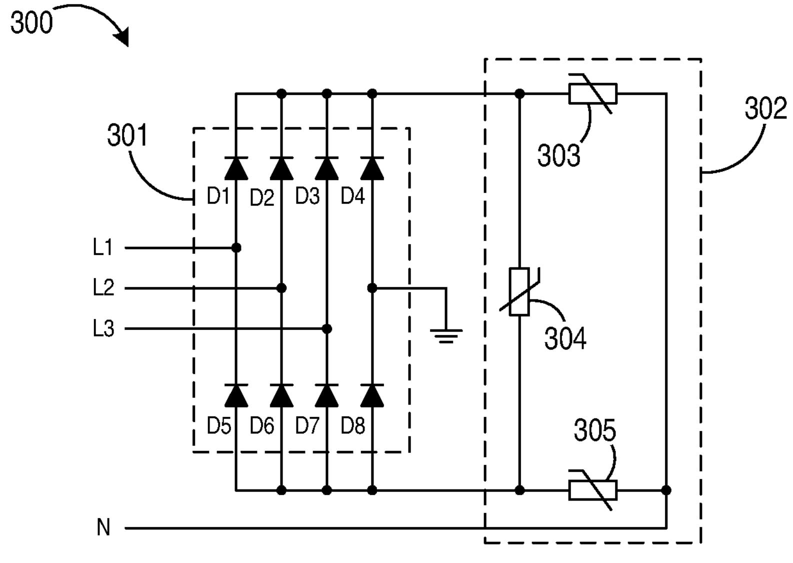
FIG. 3 is a circuit diagram illustrating another exemplary prior art voltage protection for protecting a DC power system having three DC power lines.
Figure 4:
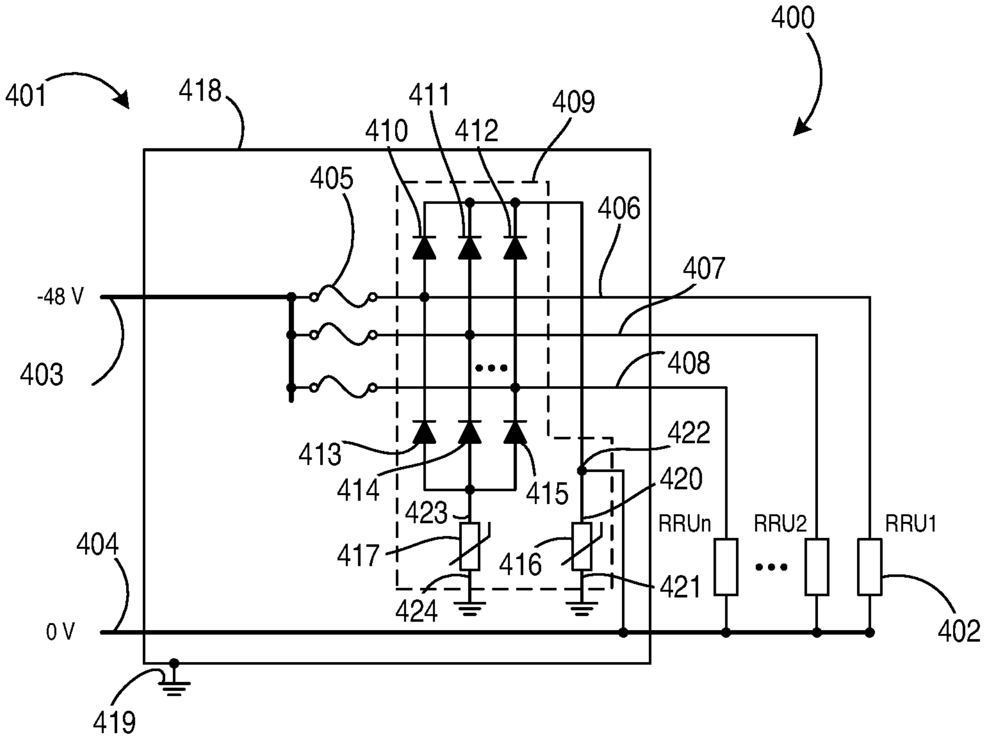
FIG. 4 is a circuit diagram illustrating a voltage surge protection system according to an embodiment of the invention.
Figure 5:
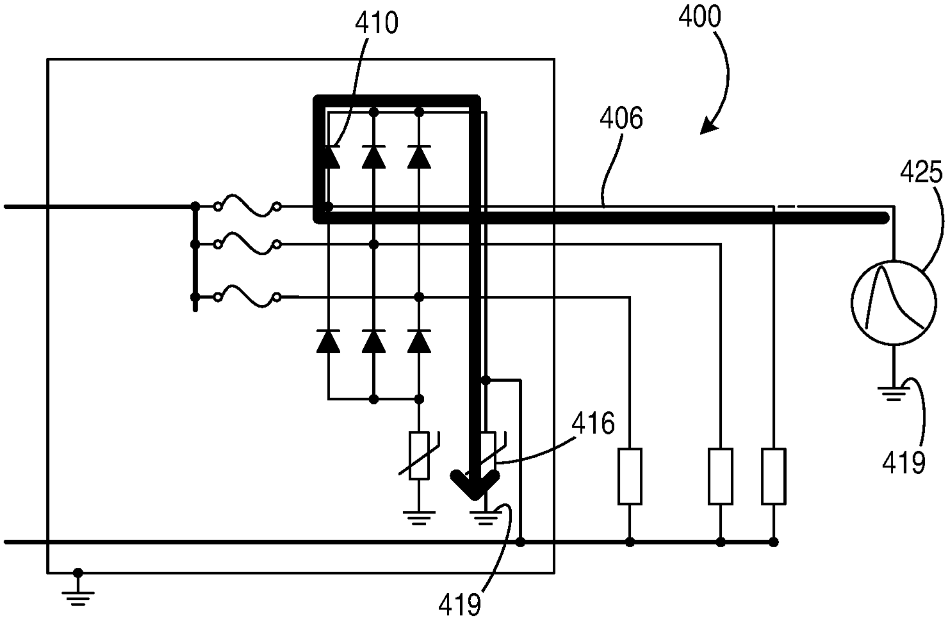
FIG. 5 illustrates the current flow for the circuit of FIG. 4 in response to a positive voltage surge between a power line and earth ground according to an embodiment of the invention.

FIG. 4 is a circuit diagram illustrating an electronic circuit 400 protected against voltage surges according to an aspect of this disclosure. In one example, circuit 400 may be a telecommunications circuit including a DC power distribution circuit 401 supplying power to a plurality of RRUs 402. In FIG. 1, a negative DC voltage circuit having a −48V voltage bus 403 and a common bus 404 is illustrated as an example. The −48V voltage bus 403 has a plurality of fuses 405 coupled thereto, each fuse coupling a respective power line 406-408 to the bus 403 for supplying power to a respective RRU 402. A surge protection system 409 including a diode array having a plurality of diodes 410-415 and two SPDs 416, 417 provides voltage surge protection for the power lines 406 and the common bus 404.

The DC power distribution circuit 401 includes a housing or enclosure 418 housing at least the fuses 405 and the surge protection system 409. The housing 418 is electrically coupled to earth ground 419.

Power lines 406-408 are coupled to the SPD 416 via respective diodes 410-412. Each diode 410-412 has a cathode coupled to a respective power line 406-408 and an anode coupled to a first terminal 420 of the SPD 416. As such, current flow between the power lines 406-408 and the SPD 416 flows in the direction toward the SPD 416 from the power lines 406-408. The SPD 416 is further coupled to earth ground 419 via a second terminal 421 and isolates the power lines 406-408 from the earth ground in the absence of a voltage surge. At a node 422 between the SPD 416 and the diodes 410-412, a connection to the common bus 404 couples the common bus 404 to the surge protection system 409 without any diode therebetween, and the SPD 416 also isolates the common bus 404 from the earth ground in the absence of a voltage surge.

Power lines 406-408 are coupled to the other SPD 417 via respective diodes 413-415. Each diode 413-415 has a cathode coupled to a respective power line 406-408 and an anode coupled to a first terminal 423 of the SPD 417. As such, current flow between the power lines 406-408 and the SPD 417 flows in the direction toward the power lines 406-408 from the SPD 417. The SPD 417 is further coupled to earth ground 419 via a second terminal 424 and also isolates the power lines 406-408 from the earth ground in the absence of a voltage surge. Thus, the pair of SPDs 416, 417 are coupled to a same voltage potential via the earth ground 419.

While FIG. 4 illustrates three power lines 406-408 coupled to corresponding RRUs 402 (e.g., RRU1, RRU2, . . . , RRUn), the surge protection system 409 is capable of protecting any number of power lines by coupling every power line to the pair of SPDs 416, 417 via a pair of diodes where one of the pair of diodes provides a current flow path between the power line and the SPD 416 and the other diode provides a current flow path between the SPD 417 and the power line. In this manner, complete voltage surge protection is provided by the surge protection system 409 based on a pair of SPDs and, for each power line, a pair of diodes.

The SPDs 416-417 include one or more surge elements configured to allow current flow to traverse the SPD in response to a voltage surge or spike and to prohibit current flow otherwise. For example, the surge element may take the form of a single metal oxide varistor (MOV). However, it should be appreciated that the surge element may take other forms, including, but not limited to, a transient voltage suppressor (TVS) diode, a thyristor surge protection device (ISM), a gas discharge tube (GDT), a spark gap overvoltage suppressor, and the like. When including a plurality of surge elements, the surge elements of the SPD may be connected in series, parallel, or a combination of series/parallel to achieve a particular surge rating.

Figure 6:
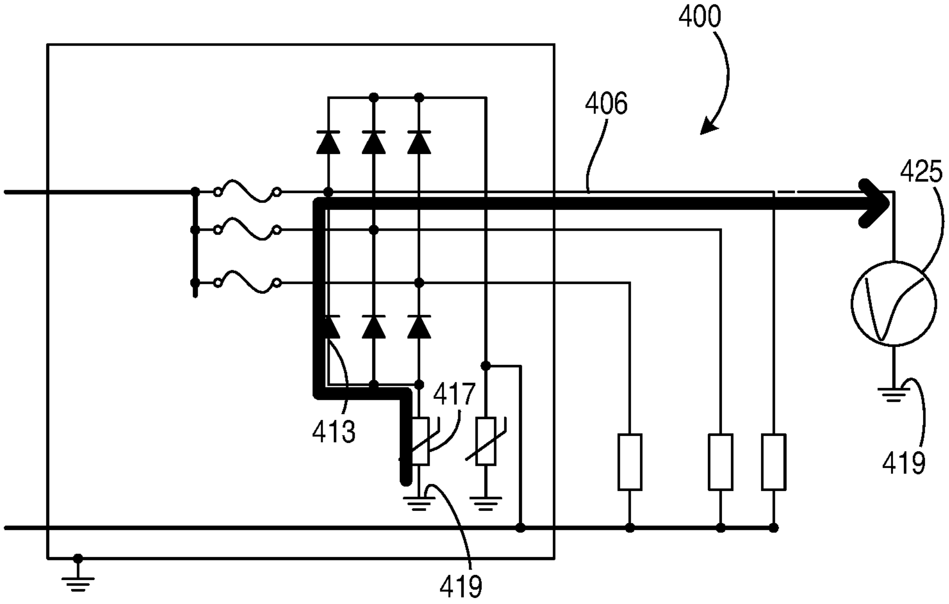
FIG. 6 illustrates the current flow for the circuit of FIG. 4 in response to a negative voltage surge between a power line and earth ground according to an embodiment of the invention.

FIGS. 5-8 illustrate current flows in circuit 400 in response to being subjected to various embodiments of a voltage surge 425 such as a lightning strike, for example, according to aspects of this disclosure. Starting with FIG. 5, current flow in circuit 400 in response to a positive voltage surge between the power line 406 and earth ground 419 is illustrated. A current flow path is illustrated from the voltage surge 425 to the earth ground 419 along power line 406 and through diode 410 and SPD 416, which, in response to the voltage surge, conducts the current therethrough. FIG. 6 illustrates current flow in circuit 400 in response to a negative voltage surge between the power line 406 and earth ground 419. A current flow path is illustrated from the earth ground 419 to the voltage surge 425 through SPD 417 and diode 413 and along power line 406.

Figure 7:
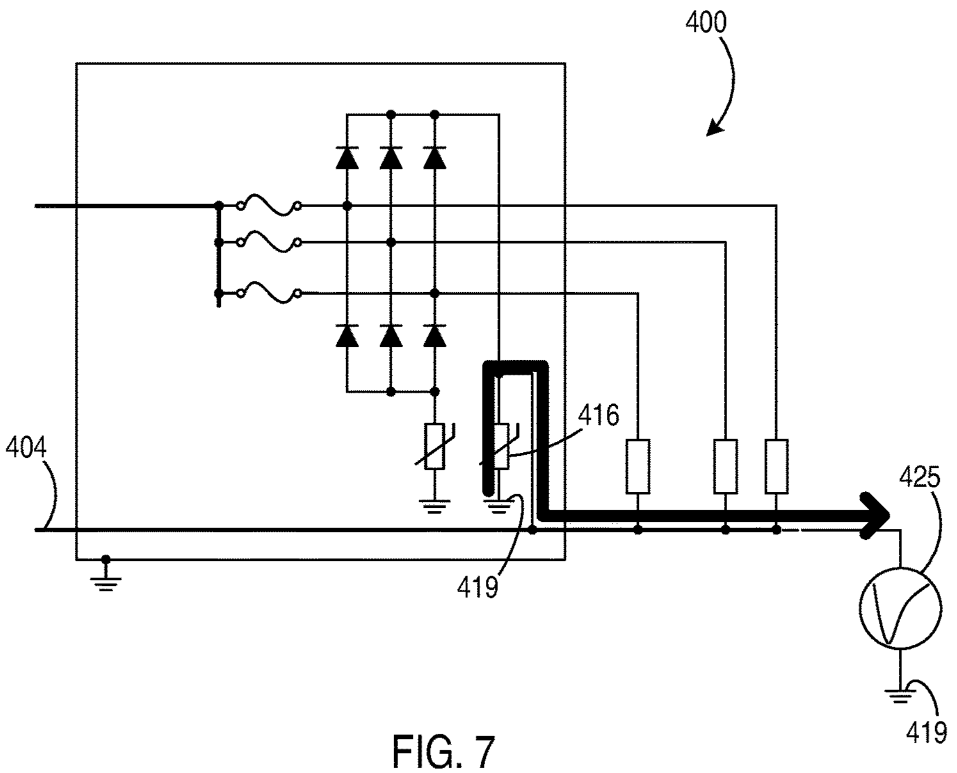
FIG. 7 illustrates the current flow for the circuit of FIG. 4 in response to a negative voltage surge between a common bus and earth ground according to an embodiment of the invention.
Figure 8:
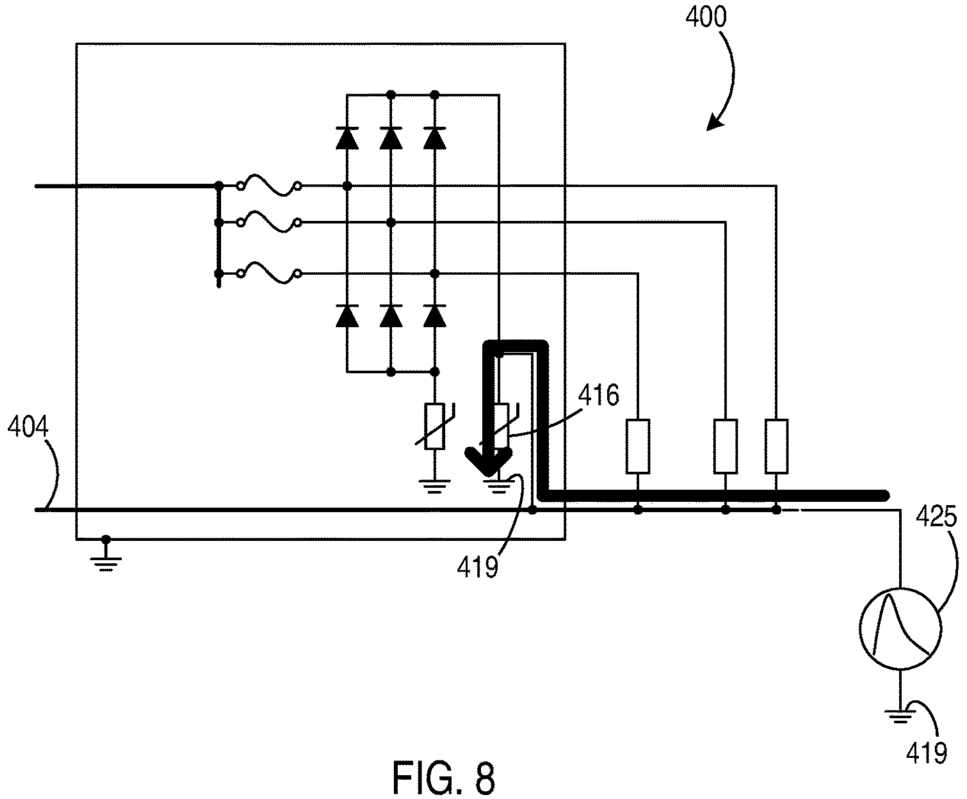
FIG. 8 illustrates the current flow for the circuit of FIG. 4 in response to a positive voltage surge between a common bus and earth ground according to an embodiment of the invention.

FIGS. 7 and 8 illustrate current flows in circuit 400 in response to negative and positive voltage surges, respectively, between the common bus 404 and the earth ground 419. In both figures, the voltage surge 425 travels between the common bus 404 and the earth ground 419 through the SPD 416 only without traversing any of the diodes 410-415. The negative voltage surge shown in FIG. 7 flows from the earth ground 419 to the common bus 404, and the positive voltage surge shown in FIG. 8 flows from the common bus 404 to the earth ground 419.

In the examples above illustrating current flow in response to voltage surges 425 affecting the power line 406 or the common bus 404 and the earth ground 419, it is understood that similar current flows will result from voltage surges between the other power lines and their respective diodes.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the invention is not to be seen as limited by the foregoing description but is only limited by the scope of the appended claims.

What is claimed is:

1. A surge protection circuit for an electronic circuit having a common power bus, a first power bus having a first voltage potential with respect to the common power bus, and a plurality of power lines providing power from the first power bus to a plurality of load devices coupled between the plurality of power lines and the common power bus, the surge protection circuit comprising:

a first surge protection device (SPD) comprising:
a first terminal coupled to a second voltage potential distinct from the first voltage potential; and
a second terminal;
a second SPD comprising:
a first terminal coupled to the second voltage potential; and
a second terminal;
a diode array comprising:
a first plurality of diodes, each diode of the first plurality of diodes comprising:
an anode coupled to a respective power line of the plurality of power lines; and
a cathode coupled to the second terminal of the first SPD; and
a second plurality of diodes, each diode of the second plurality of diodes comprising:
a cathode coupled to a respective power line of the plurality of power lines; and
an anode coupled to the second terminal of the second SPD;
wherein the second terminal of the first SPD is further coupled to the common power bus; and
wherein each of the first and second SPDs is configured to allow current flow to traverse therethrough in response to a voltage surge and to prohibit current flow therethrough in the absence of the voltage surge.

2. The surge protection circuit of claim 1, wherein the second voltage potential comprises an earth ground.

3. The surge protection circuit of claim 1, wherein, in response to a positive voltage surge between a first power line of the plurality of power lines and the second voltage potential, the surge protection circuit is configured to direct a current flow of the positive voltage surge from the first power line through a first diode of the first plurality of diodes and through the first SPD to the second voltage potential.

4. The surge protection circuit of claim 1, wherein, in response to a negative voltage surge between a first power line of the plurality of power lines and the second voltage potential, the surge protection circuit is configured to direct a current flow of the negative voltage surge from the second voltage potential through the second SPD and through a first diode of the second plurality of diodes to the first power line.

5. The surge protection circuit of claim 1, wherein, in response to a negative voltage surge between the common power bus and the second voltage potential, the surge protection circuit is configured to direct a current flow of the negative voltage surge from the second voltage potential through the first SPD to the common power bus.

6. The surge protection circuit of claim 1, wherein, in response to a positive voltage surge between common power bus and the second voltage potential, the surge protection circuit is configured to direct a current flow of the positive voltage surge from the common power bus through the first SPD to the second voltage potential.

7. The surge protection circuit of claim 1, wherein the first voltage potential comprises a negative voltage potential.

8. An electronic circuit comprising:
a common power bus;
a first power bus having a first voltage potential with respect to the common power bus;
a plurality of power lines configured to provide power from the first power bus to a plurality of load devices coupled between the plurality of power lines and the common power bus; and
a surge protection circuit comprising:
a first surge protection device (SPD);
a second SPD coupled to the first SPD via a second voltage potential distinct from the first voltage potential; and
a diode array comprising:
a first subset of diodes coupled between the plurality of power lines and the first SPD; and
a second subset of diodes coupled between the plurality of power lines and the second SPD;
wherein the second terminal of the first SPD is further coupled to the common power bus; and
wherein each of the first and second SPDs is configured to allow current flow to traverse therethrough in response to a voltage surge and to prohibit current flow therethrough in the absence of the voltage surge.

9. The electronic circuit of claim 8, wherein the surge protection circuit lacks any additional SPD for directing current flow in response to a voltage surge.

10. The electronic circuit of claim 8, wherein:
the first SPD comprises:
a first terminal coupled to the second voltage potential; and
a second terminal coupled to a cathode of each diode of the first subset of diodes;
the second SPD comprises:
a first terminal coupled to the second voltage potential; and
a second terminal coupled to an anode of each diode of the second subset of diodes;
each diode of the first subset of diodes comprises an anode coupled to a respective power line of the plurality of power lines; and
each diode of the second subset of diodes comprises a cathode coupled to a respective power line of the plurality of power lines.

11. The electronic circuit of claim 8, wherein the second voltage potential comprises an earth ground.

12. The electronic circuit of claim 11 further comprising an enclosure housing the surge protection circuit; and wherein the enclosure is coupled with the earth ground.

13. The electronic circuit of claim 8, wherein:

in response to a positive voltage surge between a first power line of the plurality of power lines and the second voltage potential, the surge protection circuit is configured to direct a current flow of the positive voltage surge from the first power line through a first diode of the first subset of diodes and through the first SPD to the second voltage potential; and in response to a negative voltage surge between a first power line of the plurality of power lines and the second voltage potential, the surge protection circuit is configured to direct a current flow of the negative voltage surge from the second voltage potential through the second SPD and through a first diode of the second subset of diodes to the first power line.

14. The electronic circuit of claim 8, wherein:

in response to a negative voltage surge between the common power bus and the second voltage potential, the surge protection circuit is configured to direct a current flow of the negative voltage surge from the second voltage potential through the first SPD to the common power bus; and in response to a positive voltage surge between common power bus and the second voltage potential, the surge protection circuit is configured to direct a current flow of the positive voltage surge from the common power bus through the first SPD to the second voltage potential.

15. The electronic circuit of claim 8, wherein the first voltage potential comprises a negative voltage potential.

16. A method of protecting an electronic circuit having a common power bus, a first power bus having a first voltage potential with respect to the common power bus, and a plurality of power lines providing power from the first power bus to a plurality of load devices coupled between the plurality of power lines and the common power bus, the method comprising:

coupling a diode array to the plurality of power lines;

coupling a first surge protection device (SPD) to the diode array, to a second voltage potential distinct from the first voltage potential, and to the common power bus; and coupling second SPD to the diode array and to the second voltage potential;

wherein each of the first and second SPDs is configured to allow current flow to traverse therethrough in response to a voltage surge and to prohibit current flow therethrough in the absence of the voltage surge.

17. The method of claim 16, wherein coupling the diode array to the plurality of power lines comprises:

coupling an anode of each diode of a first subset of diodes to the plurality of power lines;

coupling a cathode of each diode of the first subset of diodes together;

coupling a cathode of each diode of a second subset of diodes to the plurality of power lines; and coupling an anode of each diode of the second subset of diodes together.

18. The method of claim 16, wherein coupling the first SPD to the second voltage potential comprises coupling the first SPD to an earth ground; and wherein coupling the second SPD to the second voltage potential comprises coupling the second SPD to the earth ground.

19. The method of claim 18, wherein the electronic circuit further includes an enclosure housing the surge protection circuit; and further comprising coupling the enclosure with the earth ground.

20. The method of claim 16, wherein the first voltage potential comprises a negative voltage potential.

* * * * *